(12) United States Patent
Brown et al.

(10) Patent No.: US 8,913,726 B2
(45) Date of Patent: Dec. 16, 2014

(54) COMPUTER PROGRAM, METHOD, AND SYSTEM FOR PRESENTING USER-SELECTED CONTENT VIA MOBILE DEVICES

(75) Inventors: Charles Jason Brown, Gower, MO (US); Jayson Watkins, Gower, MO (US); Michael Collard, Gower, MO (US)

(73) Assignee: CWB Tech LLC, Gower, MO (US)

( * ) Notice: Subject to any disclaimer, the term of this patent is extended or adjusted under 35 U.S.C. 154(b) by 0 days.

(21) Appl. No.: 13/551,141

(22) Filed: Jul. 17, 2012

(65) Prior Publication Data
US 2014/0023183 A1      Jan. 23, 2014

(51) Int. Cl.
*H04M 1/56* (2006.01)
(52) U.S. Cl.
USPC .................................. 379/142.04; 379/93.17
(58) Field of Classification Search
CPC .... H04M 1/576; H04M 1/57; H04M 3/42042
USPC ................... 379/88.21, 93.17, 93.23, 142.04; 455/412.1
See application file for complete search history.

(56) References Cited

U.S. PATENT DOCUMENTS

| | | | |
|---|---|---|---|
| 6,977,993 B2 * | 12/2005 | Starbuck et al. | 379/88.21 |
| 8,396,514 B2 * | 3/2013 | Adams | 455/566 |
| 8,817,062 B2 * | 8/2014 | Howarter et al. | 348/14.01 |
| 2002/0172338 A1 * | 11/2002 | Lee et al. | 379/142.01 |
| 2009/0296904 A1 * | 12/2009 | Brewer et al. | 379/93.23 |
| 2010/0061541 A1 * | 3/2010 | Ke et al. | 379/207.16 |
| 2010/0233997 A1 * | 9/2010 | Hou | 455/412.1 |
| 2013/0023238 A1 * | 1/2013 | Kaplan et al. | 455/411 |

* cited by examiner

*Primary Examiner* — Fan Tsang
*Assistant Examiner* — Van D Huynh
(74) *Attorney, Agent, or Firm* — Hovey Williams LLP

(57) ABSTRACT

The present invention is directed to a computer program, method, and system for presenting user-selectable content on another user's computing device. Embodiments of the present invention permit a first user to create relationships and networks between other users. Once relationships have been created, the first user can select multimedia content to be presented to a second user or group of users. The content is presented to the second user upon the first user initiating a telephone call to the second user and during a pre-answer stage comprising ringing of the second user's computing device; upon the second user answering the call, the presentation of the content is terminated. In addition, if the second user has selected content to be presented to the first user, such content will also be displayed at the time the first user makes the call to the second user.

16 Claims, 3 Drawing Sheets

COMPUTER PROGRAM, METHOD, AND SYSTEM FOR PRESENTING USER-SELECTED CONTENT VIA MOBILE DEVICES

FIELD

Embodiments of the present invention provide a computer program, method, and system for presenting user-selected content during telephone calls. More particularly, embodiments of the present invention provide for a first user to select digital multimedia content that will be presented to a second user or group of users, via a mobile wireless communications device, upon a telephone call being initiated by the first user to the second user and during a pre-answer stage while the second user's device is ringing but the second user has yet to answer the call.

BACKGROUND

The current state of software, hardware, and network technology has seen a dramatic increase in the number of social networking and file sharing applications. Such applications now provide the ability for people to share and exchange their thoughts and ideas as well as tangible information, such as images, videos, and music. The rise in popularity and use of mobile devices, such as smartphones and tablets, has also markedly increased. Many of the social networking and file sharing applications have adapted their applications to function on mobile devices. However, to date, none of the applications have made full use of the original functional purpose of mobile devices.

Smartphones and tablets trace their origin to the first cellular phones that became popular in the late $20^{th}$ century. The functional purpose of the first cellular phones was to place telephone calls, and in particular, to place calls from locations where no land lines were available. The first cellular phones lacked the memory or processing technology to perform many additional functions. The capabilities of the cellular phones dramatically changed during the initial decade of the $21^{st}$ century, as technology related to memory, processing, and cellular networks began to grow. Technology levels have increased such that current cellular phones, or smartphones, can perform and function at nearly the level of desktop and laptop computers. Many application developers, such as developers of social networking and file sharing applications, have taken advantage of the technology and have made their applications available on mobile devices. However, to date, no application has combined the functionality of social networking and file sharing with the original purpose of cellular phones, namely making telephone calls.

SUMMARY

Embodiments of the present invention provide a computer program, a method, and a system that distribute and present user-selected multimedia content to other users via a mobile phone application, web site, or other similar electronic resource. Specifically, a first user can select videos, images, audio, video games, or other such content that will be presented to a second user when the first user makes a telephone call to the second user. In addition, the second user can likewise select content to be presented to the first user, such that when the first user makes the call to the second user, the second user's selected content will be presented to the first user. Thus, when a user makes a telephone call to a second user, each call participant is presented with content that was selected by the other user with whom she is communicating.

Embodiments of the present invention further provide that users can select content to be presented to groups of users. In such an embodiment, after the first user has selected the content to be associated with a particular group of users, each time the first user makes a call to a second user that is included in the particular group, the content will be displayed to that second user. Such an embodiment prevents the first user from having to individually associate content with every user in the group. In even further embodiments, the first user may make a call to one or more second users of the same group simultaneously, such as through a three-way call or conferences call. In such an embodiment, the content associated with the second users may be displayed to each of the second users at the same time. Thus, the first user is able to categorize the content that is to be displayed to individual and groups of users. In addition, the first user can choose when to have the content displayed by choosing when to make a telephone call to the second user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
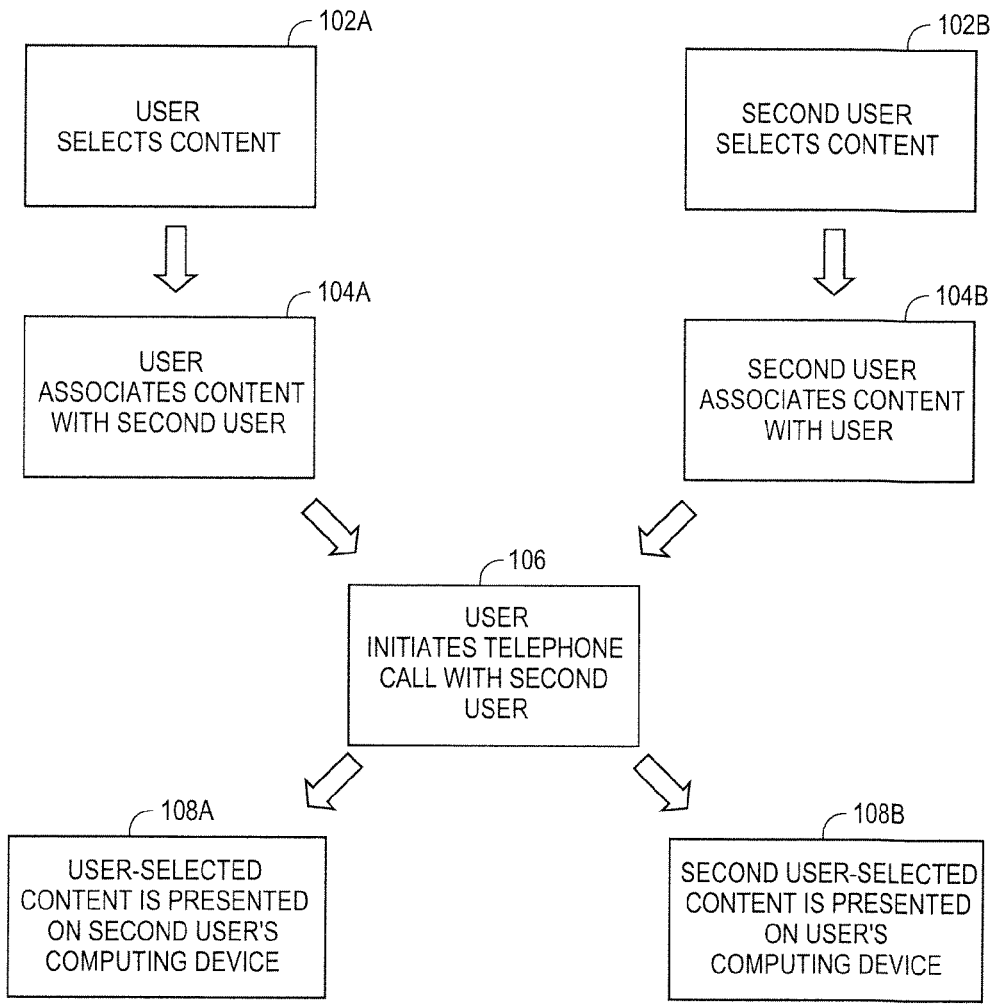
FIG. 1 is a flow chart of a method of presenting user-selected content in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides various embodiments of a computer program, a method, and a system for presenting user-selected content during telephone calls. More particularly, embodiments of the present invention provide for a first user to select digital multimedia content that will be presented to a second user or group of users upon initiation of a telephone call from the first user to the second user and during a pre-answer stage while the second user's phone is ringing; upon the second user answering the call, the presentation of the multimedia content is ceased or terminated.

The computer program of embodiments of the present invention comprises a plurality of codes segments executable by a computing device for performing the steps of the method of the present invention. The steps of the method may be performed in the order shown in FIG. 1, or they may be performed in a different order. Furthermore, some steps may be performed concurrently as opposed to sequentially. Also, some steps may be optional.

As illustrated by FIG. 1, the computer program and method of embodiments of the present invention comprise the initial Step 102A of receiving information indicative of a selection of multimedia content by a first user. In the next Step 104A, the first user associates multimedia content with a second user. Subsequently, in Step 106, information indicative of the first user making a call to the second user is received. Embodiments of the present invention then provide, in Step 108A, that upon the initiation of the telephone call but before the second user answers the call, the selected multimedia content is presented to the second user via a computing device, such as a mobile communications device, of the second user. As a non-limiting example, the user may choose to have a video of the user's daughter dancing in a recital presented to the user's mother. In such a circumstance, the user would select the dancing video and associate the video with the mother. Upon the user calling the mother, the video of the daughter dancing would be displayed on the mother's computing device. After the video has been presented, the mother can accept the telephone call and the user and the mother can communicate as if a standard telephone call has been made. In embodiments of the present invention, upon the mother (i.e., second user) accepting the call, the presentation of the content on the mother's computing device is terminated.

Figure 2:
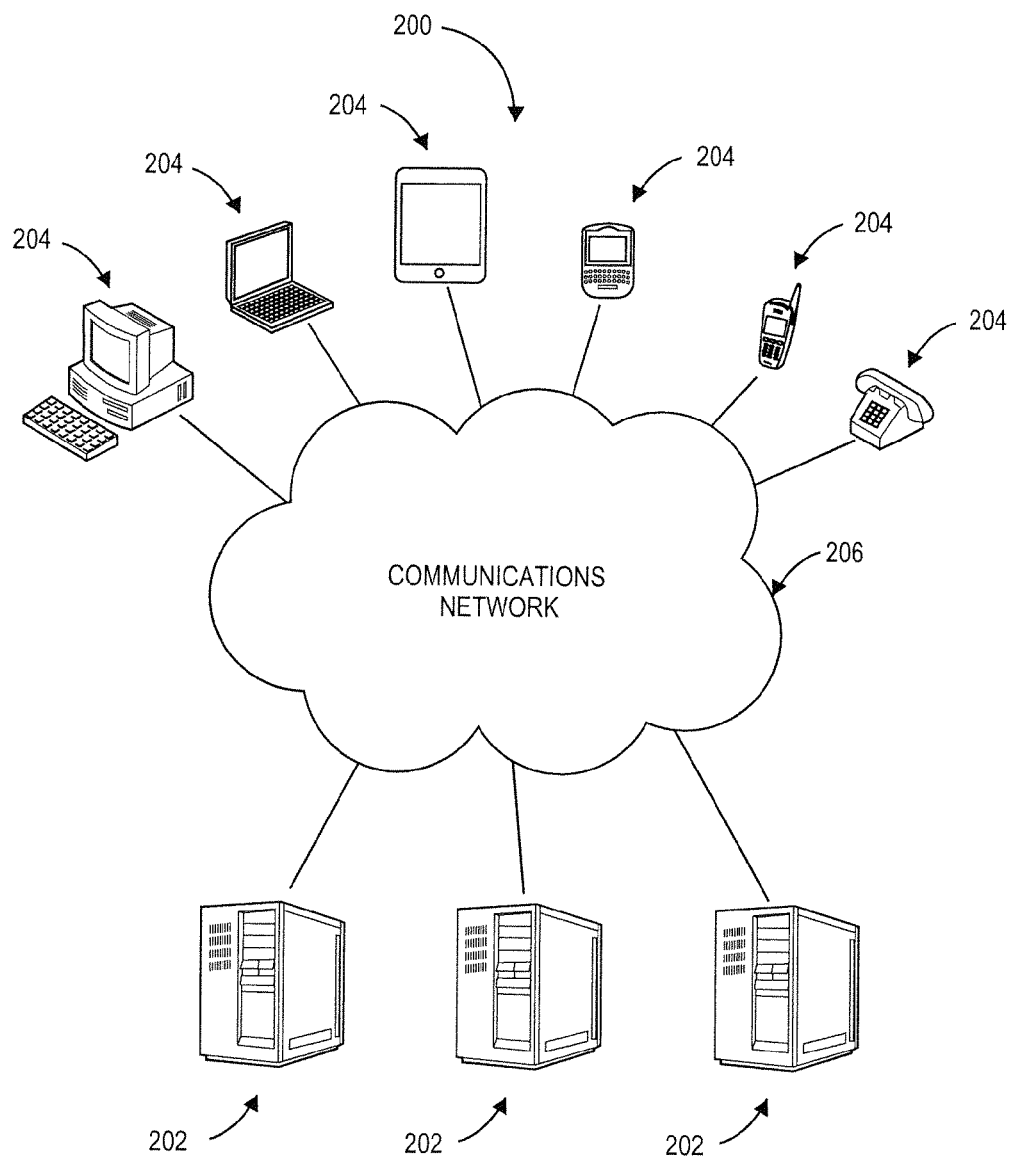
FIG. 2 is a schematic depiction of a system for presenting user-selected content constructed in accordance with various embodiments of the present invention.

The computer program and the method of embodiments of the present invention may be implemented in hardware, software, firmware, or combinations thereof using the user-selected content presentation system 200, shown in FIG. 2, which broadly comprises server devices 202, computing devices 204, and a communications network 206. The server devices 202 may include computing devices that provide access to one or more general computing resources, such as Internet services, electronic mail services, data transfer services, and the like. The server devices 202 may also provide access to a database which may store the user-selectable content and other information, such as relationship statuses, necessary for the operation of the computer program, method, and system of the present invention.

The computing devices 204 may include any device, component, or equipment with a processing element and associated memory elements. The processing element may implement operating systems, and may be capable of executing the computer program, which is also generally known as instructions, commands, software code, executables, applications, apps, and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements included in the computing devices 204, the server devices 202 may further include file stores comprising a plurality of hard disk drives, network attached storage, or a separate storage network.

The computing devices 204 may include mobile communication devices (including wireless devices), work stations, desktop computers, laptop computers, palmtop computers, tablet computers, portable digital assistants (PDA), smart phones, and the like, or combinations thereof. Specifically, various embodiments of the computing device 204 may also include voice communication devices, such as cell phones or landline phones. In preferred embodiments, the computing device 204 will have an electronic display, such as a cathode ray tube, liquid crystal display, plasma, or touch screen. In certain embodiments, the computer program of the present invention facilitates interaction and communication through a graphical user interface (GUI) that is displayed via the electronic display.

The communications network 206 may be wired or wireless and may include servers, routers, switches, wireless receivers and transmitters, and the like, as well as electrically conductive cables or optical cables. The communications network 16 may also include local, metro, or wide area networks, as well as the Internet, or other cloud networks. Furthermore, the communications network 206 may include cellular or mobile phone networks, as well as landline phone networks or public switched telephone networks.

Both the server devices 202 and the computing devices 204 may be connected to the communications network 206. Server devices 202 may be able to communicate with other server devices 202 or computing devices 204 through the communications network 206. Likewise, computing devices 204 may be able to communicate with other computing devices 204 or server devices 202 through the communications network 206. The connection to the communications network 206 may be wired or wireless. Thus, the server devices 202 and the computing devices 204 may include the appropriate components to establish a wired or a wireless connection.

The computer program of the present invention may run on the computing device or, alternatively, may run on one or more server devices 202. Thus, a first portion of the program, code, or instructions may execute on a first server device 202 or the computing device 204, while a second portion of the program, code, or instructions may execute on a second server device 202 or the computing device 204. In some embodiments, other portions of the program, code, or instructions may execute on other server devices 202 as well. For example, the user-selectable content and relationship statuses may be stored on a memory element associated with the server device 202, such that the content is remotely accessible for the user of the computer program. Alternatively, the user-selectable content and relationship statuses may be stored on the memory element associated with the respective computing device 204 for the user. In embodiments where the user-selectable content and relationship statuses are stored remotely, the user may authenticate their identity via the computing devices to access the program.

In embodiments of the present invention, a downloadable version of the computer program is stored, at least in part, on the server device 202. A user can download at least a portion of the computer program onto a computing device via the network 206. In embodiments of the present invention, the computer program is an "application," such as an "app" for a mobile device. After the computer program has been downloaded, the program can be installed on the computing device in an executable format. Upon a first execution of the computer program, the user is required to establish an account by creating a username and password. In addition, the user may be required to associate a telephone number with the account. In certain embodiments, the telephone number associated with their account will correspond to a smartphone, tablet, or other mobile device that is capable of presenting and displaying various formats of digital multimedia content. In further embodiments, the user is required to enter additional information, including age, sex, address, or the like. All information entered by the user is received, via the network, and is stored on the server device 202.

After an account has been established for a first user, connections or relationships may be established between the first user and additional ("second") users of the present invention. Users may establish connections with any other user, but many connections will likely be linked through established personal relationships, such as family, work, social, or similar affiliations. To facilitate the connecting process, the present invention may include a search function that permits the first users, via the GUI, to search for second users with whom the first user wishes to connect. In other embodiments, the first user may connect with persons who are not yet users of the program. In such an embodiment, the present invention displays a list of all "contacts" saved in the user's computing device, and the user selects those contacts the user wishes to invite. Upon the selection, the present invention transmits invites to each selected contact. Thus, embodiments of the present invention parse through the first user's contacts list and transmits invitations to those persons the user wishes to connect with. In further embodiments, the present invention may automatically transmit an invitation to all of those persons listed in the user's contacts list immediately after the user has established the account. The invitation may be transmitted directly from the server 202 via the network 206 and may be in the form of a text message, email, instant message, Twitter™ feed, Facebook™ message, or any other messaging function that is suitable for providing the invitation. The invitation may include an Internet address or link in a body of the message that directs an invitee to a location on the server 202 from which the invitee can download and install the computer program of the present invention. In even further embodiments, the contact list may be obtained from the user's social media accounts, such as a Facebook™ account, In addition to facilitating individual connections between users, embodiments of the present invention provide for a first user to organize one or more connected second users into groups. The present invention permits users to organize groups based on a plurality of grouping methodologies. For instance, the user may group each of those second user connections that are family members into a family group. Similarly, the user may group each of the second user connections that are friends into a friend group. The above mentioned grouping categories are provided only for exemplary purposes and are not meant to be restrictive or limiting. As will be discussed in more detail below, the grouping of second users facilitates the user's ability to efficiently direct certain types of user-selectable content at specific groups of users.

Embodiments of the present invention further facilitate connecting users by monitoring each user's usage of the present invention. In particular, the present invention monitors and tracks each created account and established connection. By monitoring the connections made by new and existing users, embodiments of the present invention may implement relationship algorithms, which recommend that certain users or groups of users make connections with other users. For instance, if a first user has currently established five connections with second users, and each of the five second users has established a connection with a sixth user, then the present invention may provide a recommendation to the first user that the user should also connect with the sixth user. The recommendation may come in the form of a text notice, mobile update, email, or the like. Such recommendations facilitate the ability for users to rapidly and efficiently grow their user connection base, while ensuring the users being brought together are compatible or otherwise have appropriate relationships.

Once a connection between users or groups of users has been established, embodiments of the present invention receive and maintain information indicating each user's connection and grouping methodology within the server 202. In addition, a first user's connection information may in certain embodiments be stored on the first user's computing device.

Figure 3:
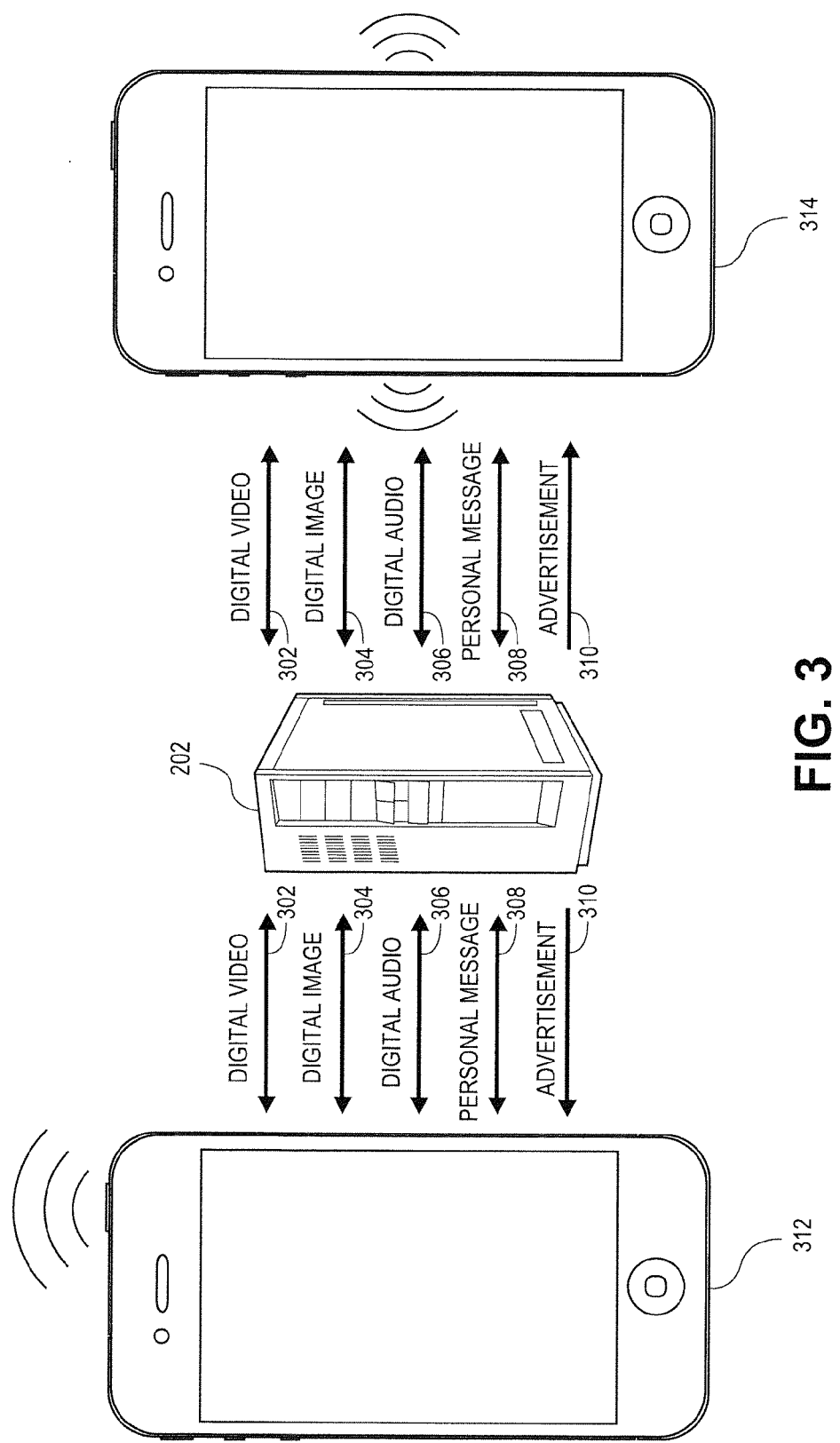
FIG. 3 is an illustration of the content flow and types of content that may selected for presentation.

After establishing one or more connections with a second user or group of users, a first user may select a plurality of multimedia content, which can be distributed and presented to second users via embodiments of the present invention. The content, as illustrated by FIG. 3, may include digital videos 302, digital images 304, digital audio 306, personal message displays 308, or the like. In addition, the content may be in the form of a user-selected ringtone or video game. The user-selected video may include digital videos in a wide range of formats; however, in certain embodiments, the formats may be in a standard format playable on smartphone and tablet devices, such as M4P or 3GP, with video encoding including codecs such as mpeg4 and H.264. The user-selected images may include digital images in a wide range of formats, including such popular formats as .png, .jpg, .gif, or the like. The user-selected audio files may include digital audio files in a wide range of formats including 3GP, M4P, WAV, MP3, or the like. The listing of file formats and codecs is presented for exemplary purposes only and is not meant to be in any way limiting. Embodiments of the present invention facilitate any number of digital file formats and compression types.

The user-selected message display may be in the form of a brief textual status line or update. In addition, the message display may be in any of the forms or combination of forms of the content listed above, such as video, audio, image, or the like. The message display may include a unique, brief message that can be created and/or modified by the user. The message display may be used to provide a status-update for the user, such as "I'm off to work" or "The family's heading for vacation." In addition, the message display may be used to provide a description or context to other portions of the user-selectable content that is presented. In certain embodiments, the message display may be presented concurrently with the other user-selected content; however, in other embodiments, the message display may not be presented, and in its place an advertisement, as discussed more fully below, will be presented.

The user-selected content may be selected by the user from user-controlled content that is already owned or possessed by the user. Such content may include videos, images, audio, games, or other content that was created or possessed by the user via the user's computing device 312, digital camera, image scanner, digital video camera, audio recorder, or the like. In such cases, the content may be stored on the user's computing device. In other instances, the user may select content from sources other than user's computing device. Such content may be under the control of the user but is located on another entity's computing device, server, website, or domain such as on Facebook™, Twitter™, Instagram™, Viddy™, or other similar social networking/sharing sites. Embodiments of the present invention may facilitate the downloading or saving of the content from the social/networking sites onto the user's computing device for further use with the present invention.

In certain embodiments, once the user has selected user-controlled content, the content may be uploaded to the server 202 of the present invention. After the user-controlled content is stored on the server, embodiments of the present invention provide the user with access to the content, such that the user can view, alter, delete, or otherwise modify the content. In even further embodiments of the present invention, user-controlled content that is stored on social networking/sharing sites, and that has been selected, may be automatically downloaded and copied to the server 202 without needing to be downloaded to the user's computing device. In any event, the present invention facilitates the saving of content onto the server 202, via uploading through the network, within approximately 30 seconds from the time the content was selected. Once the content has been stored on the server, the user will be sent a notification message that the content has been selected and is ready to be associated and presented to second users. The notification may be in the form of a graphic update, via the GUI, or by text message, email, or other similar notification method. The content saved on the server 202 will remain on the server for future use, until the user that selected the content has removed it.

In other embodiments of the present invention, the user may select content that is not stored and may never be stored on the user's computing device 314. In such instances, the user may select content that is under the control of another entity and is stored on the other entity's computing device, server, database, website, other Internet location, or the like. Instead of downloading or transferring the files to the user's computing device, the user may select the content, and embodiments of the present invention copy and store the files to the server 202. In further embodiments, the present invention may only store the location of the files in the server 202. In such embodiments, only the location of the files are stored, such that when the files are presented to second users, as will be more fully described below, the files are presented in a "linkable" or "live streaming" format. This process may be necessary when user-selected content has copyright restrictions or other ownership issues that may restrict the content from being copied, altered, or otherwise used.

Embodiments of the present invention provide for the first user to associate the selected multimedia content with second users or groups of users that the first user is connected with. As a non-limiting example, the first user, with her computing device, may make a video recording of the first user's child playing a softball game. Subsequently, through embodiments of the present invention, the first user selects the softball game video, and the video is uploaded via the network 206 and received by the server 202. Once the video has been selected, the first user may associate the video with the user's mother who is a second user and is connected to the first user. Such association information may additionally be stored in the server 202. As will be described more fully below, the softball game video may then be presented to the first user's mother via the second user's computing device. In even further embodiments, user's can associate content with groups of users. For instance, if the user is connected with several family members and has grouped the family members into a family group, then the user may associate the softball game video with the entire group. In such an embodiment, the user may associate different types of multimedia content with a plurality of second users and/or groups of users with whom the user has connected.

In embodiments of the present invention, the user-selected multimedia content is presented from the server 202, via the network 206, to the computing device 314 of the second users or groups of users with whom the first user is connected and has associated the content. In further embodiments, the content may be presented directly from the first user's computing device 312, via the network 206, to the computing device 314 of the second user. Such an embodiment would bypass the need for content to be stored directly on the server 202. In even further embodiments, once the first user has selected and associated multimedia content with the second user, the content may be automatically transmitted to and stored on the second user's computing device 314. The content may be transmitted within a specified amount of time (such as approximately 10, 15, 20, 25, 30, 45, or 60 seconds) from when the content has been associated with the second user. Such an embodiment provides for the multimedia content to be readily available for presentation on the second user's computing device. The embodiment avoids potential network issues that may prevent or delay the multimedia content from being promptly transmitted to and presented on the second user's computing device during the initiation of a telephone call, as is more fully described below.

The content is presented to the second user, via the GUI of the second user's computing device 314, when the first user initiates a telephone call to the second user via the first user's computing device 312. In certain embodiments, the content may be displayed to the second user after the telephone call has been initiated but before the second user answers the call, i.e., the content is presented on the second user's device while the second user's device is ringing. As used herein, a "pre-answer" or "pre-answering" stage is defined to include the period of time coinciding with initiation of the telephone call by a first user and the second user's telephone (e.g., computing device) ringing; the pre-answer stage is terminated upon the second user answering the call. In embodiments of the present invention, upon the second user answering the call, presentation of the content is ceased or terminated. Alternatively or in addition, the content may be presented for a set amount of time (such as 10, 15, 20, 25, 30, 45, or 60 seconds and either for a default time or for a user-selectable time) or until the content has been presented in its entirety. Either of the first or second user may select whether the content is presented for a set period of time, until the content is presented in its entirety, or until the second user answers the telephone call.

In event further embodiments of the present invention, a variety of user-selectable options may be provided. For example, the first and/or second user may select that the user who initiated the call (i.e., the first user) is notified that the second user will answer the phone call after presentation of the content is complete (e.g., after the transferred video file has completely ran). This selection may be presented to the second user with the presented content or as a permanent selection applicable to all transferred content and made via the computer program. Another user-selectable option is that the phone call is automatically answered after completion of the transferred content. Yet another option is that the user may change the ring tone depending on the nature or type of transferred content, and in embodiments, the ring tone on the second user's device may coincide with at least a portion of the audio file associated with the transferred content.

If the first user has associated more than one user-selected content item for a second user, then the first user can choose to have each associated item presented during separate telephone calls in a specified order, randomly, cyclically, or some other fashion. In addition, more than one user-selected content item may be presented during each individual call. After the content has been presented, the second user may choose to answer the telephone call so that the first user and the second user can communicate via their respective computing devices. In certain embodiments, the present invention may include a notification icon that is presented to the first user, via the GUI, indicating that the second user will answer the telephone call after the content has finished being presented. In even further embodiments, the present invention may provide for the telephone call to be automatically answered by the second user immediately following the content presentation.

In further embodiments, once a call from the user to the second user has been made, a copy of the user-selected content may be transferred from the server 202 to the computing device 314 of the second user for later presentation or review. Although the content may be transferred to the second user's computing device, additional embodiments may provide that the content remains stored on the server and the second user is provided access to said content via the GUI. In even further embodiments of the present invention, the content may be delivered to a social networking/sharing account of the second user for further access. Such accounts may include Facebook™, Twitter™, Instagram™, Viddy™, or the like.

In addition to presenting user-selected content, embodiments of the present invention provide for advertisements to be presented to users. The advertisements may be in the form of banner ads, text, graphics, images, animation videos, audio, rich media, or the like, which may be displayed on both the first and second users' computing devices before or concurrently with the presentation of the user-selected content. In addition, the advertisements may be in the form of full page ads that are presented before or after the presentation of the content. In certain embodiments, the users may select, via the GUI, to pause the presenting of the advertisements until after the user-selected content has been presented and/or the telephone call has been completed. In even further embodiments, the advertisements may be stored in the computing device or otherwise accessible via the server for later presentation to the users. In addition, the users may be provided with promotional consideration for permitting the advertisements to be presented.

Although the preceding description was provided in reference to a first user selecting content to be displayed to one or more second users, it is noted that second users are also considered first users with full capabilities and permission to use all embodiments of the present invention. Therefore, each second user may also associate and select content to be displayed to the first user and all additional second users or groups of users with whom the second user is connected. The selection and association of content by the second user is conducted in the same manner as was detailed above for the first user. Embodiments of the present invention provide that when the first user makes a telephone call to the second user, as the first user's selected content is being presented to the second user via the second user computing device 314, the second user's content that was selected for the first user is likewise presented to the first user via the first user's computing device 312.

In addition to permitting users to group connected secondary users into groups, further embodiments of the present invention may permit the establishment of social groups. Social groups are groups of user that are directed to one or more social clubs, networks, or organizations. For instance, users who are members of a charitable organization may elect to create a social group directed to the charitable organization. In such a group, the users included in the social group are considered member users. The social groups may include one or more member users that have been selected as the manager of the group. The manager may invite users to join the group or may accept or deny requests to join the group from users. Similar to selecting and associating content by users and second users, as described above, the social group can select content to be associated with and presented to its member users. In such an embodiment, the presented content may include content related to the activities of the social group, such as up-coming events, notices, or updates. The presentation of content is initiated by the manager of the social group making one or more phone calls to the associated member users.

Thus, as can be appreciated, embodiments of the present invention provide for users to categorize a plurality of user-selected multimedia content in a variety of ways and provide for the distribution and presentation of said content to targeted users or groups of users via telephone calls.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium with an executable program stored thereon for presenting user-selectable multimedia content via an electronic resource, wherein the program instructs a processor to perform the following steps:

receive information indicative of a selection of a first multimedia content by a first user;

receive information indicative of the first user associating the first multimedia content with a second user;

receive information indicative of the first user initiating a first telephone call to a computing device of the second user, wherein the first multimedia content is included in the first telephone call;

cause the first multimedia content to be stored on a memory of the computing device of the second user and to be presented on an electronic display of the computing device of the second user, wherein the first multimedia content is presented upon initiation of the first telephone call by the first user and during a pre-answer stage before the second user answers the first telephone call; and upon the second user answering the first telephone call, terminate presentation of the first multimedia content on the electronic display of the second user's computing device, wherein the first multimedia is presented on the electronic display of the computing device of the second user directly from the memory upon receiving indication of initiating subsequent telephone calls.

2. The computer readable storage medium of claim 1, further including the steps of:
receive information indicative of a selection of a second multimedia content by the second user;
receive information indicative of the second user associating the second multimedia content with the first user;
cause the second multimedia content to be stored on a memory of the computing device of the first user and to be presented on an electronic display of a computing device of the first user,
wherein the second multimedia content is presented upon initiation of the first telephone call by the first user and during the pre-answer stage before the second user answers the first telephone call; and
upon the second user answering the first telephone call, terminate presentation of the second multimedia content on the electronic display of the first user's computing device,
wherein the second multimedia is presented on the electronic display of the computing device of the first user directly from the memory of the computing device of the first user upon receiving indication of initiating subsequent telephone calls.

3. The computer readable storage medium of claim 1, wherein the multimedia content is comprised of at least one of the following: digital video, digital audio, digital pictures, text message, status message, or advertisement.

4. The computer readable storage medium of claim 1, wherein the multimedia content is comprised of an Internet address or web-link whereby the first and second users can visit the Internet address or the web-link to be presented with additional multi-media content.

5. The computer readable storage medium of claim 1, wherein users can associate multimedia content with one or more groups of second users.

6. The computer readable storage medium of claim 1, further including the step of: notifying the first user that the second user can answer the telephone call after the first multimedia content has been presented.

7. The computer readable storage medium of claim 1, further including the step of; causing the second user's computing device to automatically accept the telephone call immediately after the first multimedia content has been presented.

8. A non-transitory computer readable storage medium with an executable program stored thereon for presenting user-selectable content via an electronic resource, wherein the program instructs a processor to perform the following steps:
receive information indicative of a selection by a first user to associate a first multimedia content with a second user, the first multimedia content being stored on a social networking website;
receive information indicative of the first user initiating a first telephone call to the second user;
automatically create a copy of the first multimedia content from the social networking website upon initiation of the first telephone call and automatically store the copy of the first multimedia content on a memory of a computing device of the second user upon initiation of the first telephone call; and
upon receiving said indication of initiating the first telephone call, cause the first multimedia content to be presented on an electronic display of the computing device of the second user,
wherein the first multimedia content is presented upon initiation of the first telephone call by the first user and during the pre-answer stage before the second user answers the telephone call, and
wherein the first multimedia is presented on the electronic display of the computing device of the second user directly from the memory of the computing device of the second user upon receiving indication of initiating subsequent telephone calls.

9. The computer readable storage medium of claim 8, wherein the first multimedia content includes a digital picture.

10. The computer readable storage medium of claim 8, wherein the first user can associate additional multimedia content with the second user.

11. The computer readable storage medium of claim 10, wherein the first user can choose to have the multimedia content presented in a specified order.

12. The computer readable storage medium of claim 10, wherein the first user can choose to have the multimedia content presented randomly.

13. The computer readable storage medium of claim 8, wherein the first multimedia content is presented with an advertisement.

14. The computer readable storage medium of claim 8, wherein the first multimedia content is displayed until the first or subsequent telephone call is ended.

15. The computer readable storage medium of claim 10, wherein the additional multimedia content associated with the second user can be selected from a different source than the first multimedia content.

16. A non-transitory computer readable storage medium with an executable program stored thereon for presenting user-selectable content via an electronic resource, wherein the program instructs a processor to perform the following steps:
receive information indicative of a selection by a first user to associate a first multimedia content with a second user, the first multimedia content including a digital picture;
receive information indicative of the first user initiating a first telephone call to the second user,
wherein the first multimedia content is included in the first telephone call; and
upon receiving said indication of initiating the first telephone call, cause the digital picture of the first multimedia content to be stored on a memory of the computing device of the second user, causing an advertisement to be wirelessly streamed to the computing device of the second user, and causing the advertisement and the digital picture of the first multimedia content to be presented on an electronic display of the computing device of the second user,
wherein the digital picture of the first multimedia content and the advertisement are presented upon initiation of the first telephone call by the first user until the first telephone call is ended,
wherein advertisements are wirelessly streamed to the computing device of the second user upon initiation of subsequent telephone calls, and wherein the digital picture of the first multimedia is presented on the electronic display of the computing device of the second user directly from the memory of the computing device of the second user upon receiving indication of initiating subsequent telephone calls.

* * * * *